United States Patent [19]

Strassman

[11] Patent Number: 5,460,649
[45] Date of Patent: Oct. 24, 1995

[54] FIBER-REINFORCED RUBBER ASPHALT COMPOSITION

[76] Inventor: David R. Strassman, 2534 S. Fish Hatchery Rd., Madison, Wis. 53711

[21] Appl. No.: 254,221

[22] Filed: Jun. 6, 1994

[51] Int. Cl.[6] .............................. C04B 16/06; C08L 95/00
[52] U.S. Cl. .......................... 106/668; 106/282; 404/32
[58] Field of Search ................................. 106/668, 282; 404/32; 521/41

[56] References Cited

U.S. PATENT DOCUMENTS

| | | |
|---|---|---|
| 2,841,060 | 7/1958 | Coppage .................................. 94/23 |
| 3,474,625 | 10/1969 | Draper et al. . |
| 3,505,260 | 4/1970 | Woodruff . |
| 4,021,393 | 5/1977 | McDonald ............................. 404/72 |
| 4,086,291 | 4/1978 | Svensson . |
| 4,115,335 | 9/1978 | Reusser et al. . |
| 4,175,978 | 11/1979 | Marzocchi et al. . |
| 4,237,152 | 12/1980 | Loricchio et al. . |
| 4,251,586 | 2/1981 | Marzocchi et al. . |
| 4,273,685 | 6/1981 | Marzocchi et al. . |
| 4,316,829 | 2/1982 | Roberts . |
| 4,332,705 | 6/1982 | Uffner . |
| 4,333,866 | 6/1982 | Uffner . |
| 4,394,482 | 7/1983 | Uffner . |
| 4,404,316 | 9/1983 | Marzocchi et al. . |
| 4,412,864 | 11/1983 | Kurashige et al. . |
| 4,440,816 | 4/1984 | Uffner . |
| 4,485,144 | 11/1984 | Uffner et al. . |
| 4,492,781 | 1/1985 | Duszak et al. . |
| 4,528,241 | 7/1985 | Uffner et al. . |
| 4,548,962 | 10/1985 | Lindmark . |
| 4,556,338 | 12/1985 | Fahey . |
| 4,663,370 | 5/1987 | Marvel, Sr. et al. . |
| 5,110,627 | 5/1992 | Shoesmith et al. . |
| 5,244,304 | 9/1993 | Weill et al. ............................. 404/67 |
| 5,290,356 | 3/1994 | Frankowski ........................... 106/726 |
| 5,304,576 | 4/1994 | Martinez ................................. 521/41 |

Primary Examiner—Mark L. Bell
Assistant Examiner—Paul Marcantoni
Attorney, Agent, or Firm—Stroud, Stroud, Willink, Thompson & Howard

[57] ABSTRACT

The invention provides a fiber-reinforced rubber asphalt concrete composition suitable for paving applications and a method of making the composition. Also provided is a method for converting a conventional asphalt plant to one capable of producing the fiber-reinforced rubber asphalt concrete composition of the invention and an apparatus suitable for doing same.

17 Claims, 4 Drawing Sheets

FIBER-REINFORCED RUBBER ASPHALT COMPOSITION

TECHNICAL FIELD

This invention relates generally to asphalt compositions and in particular, to a modified asphalt bituminous concrete composition that includes recycled crumb rubber and fiber. The invention is particularly well-suited as a composition for repaving and repairing road surfaces where such surfaces of conventional asphalt have cracked.

BACKGROUND OF THE INVENTION

Asphalt is a well-known cementitious material containing predominantly bitumens which occur in nature as such, or are obtained as the residue in the refining of petroleum. Asphalt has been used for many years in road paving applications. Many miles of existing highways consist of asphalt in combination with various aggregates such as gravel, crushed stone and sand.

Despite the widespread use of asphalt in road paving applications, asphalt suffers from certain limitations due to corrosion, deterioration and disintegration. Some of these problems are caused by mechanical action due to contact of wheels of vehicles and other objects in passing over the surfaces of the asphalt pavements. Other causes are due to the inherent nature of asphalt compositions which can range from hard to soft. If the composition is hard and brittle, it resists distortions. However, it cracks and allows water to enter, and the formation of ice further breaks up the asphalt. If the composition is too soft, it is too flexible and distorts. It is also known that as the asphalt ages, volatile components evaporate, causing brittleness and a decrease in the stability of the road surface. A typical asphalt road surface begins to show signs of deterioration and disintegration about 4–5 years after application.

To extend the time when repaving must occur, various preventive maintenance techniques are practiced. The problem with these preventive maintenance programs is that they are costly in terms of material and personnel for any advantage gained and provide no strength to the road surface. Further, the application of a layer on top of a cracked and deteriorated surface results in an unstable condition with the new layer cracking essentially where the old surface was cracked, i.e., reflective cracking.

Cost is an important consideration with an asphalt or modified asphalt, as is the durability of the surfaces, and the frequency and nature of required preventive maintenance in response to constant weather and vehicular-induced damage. In many cases, however, the available manpower and budgets are not sufficient to assure consistent adherence to a regular maintenance schedule.

Extensive development has recently taken place in which, in road paving applications, the asphalt is modified with various additives such as fibers or polymers or elastomers, such as rubber and epoxy.

It has been reported that flex and durability have been substantially improved with respect to paving and sealing compositions by including reinforcing fiber materials, such as fiberglass, and other synthetic polymeric fibers, such as polyolefins. See, for example, U.S. Pat. No. 4,663,370 issued to Marvel; U.S. Pat. No. 4,492,781 issued to Duszak et al.; U.S. Pat. No. 4,412,864 issued to Kurashige et al.; U.S. Pat. No. 4,316,829 issued to Roberts; U.S. Pat. No. 3,505,260 issued to Woodruff; and U.S. Pat. No. 3,474,625 issued to Draper et al. A preferred synthetic fiber material for such purposes, has been found to be polypropylene fiber, because of a high degree of compatibility with asphalt. Such material has been used in amount of 0.25%–10% by weight fiber per weight of asphalt concrete depending upon intended use.

While improving flex and durability, addition of synthetic fiber material such as polypropylene adversely affects pumpability and workability characteristics of the asphalt composition. Fiber clumping occurs in the preparation of the composition and during conventional smoothing operations (i.e., rolling and compaction).

Another substance that has been added to asphalt compositions is rubber. Two general processes are known for making rubber asphalt—one is the so-called "wet process," the other the so-called "dry process." In the wet process, the rubber is admixed with the asphalt cement prior to the addition of any aggregate. The rubber chemically reacts with the asphalt cement to modify the asphalt; such asphalt is often referred to as "chemically-modified asphalt." See, for example, U.S. Pat. Nos. 4,394,482; 4,333,866; 4,332,705; 4,440,816; 4,485,144; and 4,528,241 issued to Uffner; and U.S. Pat. Nos. 4,273,685; 4,404,316; 4,251,586; and 4,175,978 issued to Marzocchi et al.

In the dry process, the rubber is used as another aggregate along side the traditional mineral aggregates, and is added into the aggregate prior to admixing with the asphalt cement. See, for example, U.S. Pat. No. 4,086,291 issued to Svensson; U.S. Pat. No. 4,548,962 issued to Landmark. To date, none of the rubber asphalt compositions, made by either process, has achieved any degree of commercial success and widespread use, due in part to the high cost of manufacture. The present inventor is unaware of any attempts to combine fiber and rubber, but Duszak et al., U.S. Pat. No. 4,492,781, state that combining rubber and fiber to form a fiber-containing rubber asphalt seems incompatible.

Thus, notwithstanding the many known practical problems for asphalts or even asphalts modified with certain additives, the art has not adequately responded to date with the introduction of an asphalt concrete composition that has a surface of greater durability and flex and that resists corrosion, deterioration, and cracking, which is applicable over a wide range of temperature conditions, particularly lower temperatures, which can be laid down and cured within a reasonably short period of time, and yet which requires less maintenance and has a cost competitive with conventional asphalt.

SUMMARY OF THE INVENTION

The present invention provides an improved rubberized asphalt composition that is more durable, longer lasting, more resilient, less prone to cracking than prior conventional asphalts, including prior modified asphalts.

The foregoing, and other advantages of the present invention, are realized in one aspect thereof in an asphalt concrete composition, comprising in percent by weight, 1%–10% rubber aggregate; 0.05%–0.4% fibrous material; 1%–8% asphalt cement; and the remainder mineral aggregate. The rubber aggregate is suitably recycled crumb rubber, particularly rubber from used vehicle tires. Preferably, the fibrous material is a synthetic polymeric fiber, most preferably an anti-static treated polyester fiber.

In another aspect, the invention relates to a method of making an asphalt composition. The method includes the combining in admixture in percent by weight, 1%–10% rubber aggregate; 0.05%–0.5% fibrous material; 1%–8% asphalt cement; and the remainder mineral aggregate. Specifically, the method includes steps of (a) heating the mineral aggregate to a temperature of about 325°–500° F.; (b) admixing the mineral aggregate with the rubber aggregate; (c) admixing the fibrous material with the mineral aggregate and the rubber aggregate; and (d) admixing the asphalt cement to form a modified asphalt concrete composition. The method optionally includes after heating the mineral aggregate, admixing recycled asphalt as a portion of the aggregate with the heated mineral aggregate, thus, substituting recycled asphalt for a portion of the mineral aggregate.

In another aspect, the invention is a method of paving or repaving a road surface, which comprises the steps of applying at least one layer of an asphalt composition to the surface at a temperature of about 280° F. or greater, the composition including in percent by weight, 1%–10% rubber aggregate; 1%–8% asphalt cement; 0.05%–0.5% fiber; and the remainder mineral aggregate; and compacting the layer until it is no longer elastic.

The invention also relates to a method of using recycled crumb rubber, which comprises admixing 1%–10% by weight recycled crumb rubber into an admixture 1%–8% fiber; 1%–8% asphalt concrete; and the remainder mineral aggregate. This constitutes another aspect of the invention.

The invention also includes a road surface that includes at least one layer of a modified asphalt composition, that composition being the composition in accordance with the present invention, namely, 1%–10% rubber aggregate; 1%–8% asphalt cement; 0.05%–0.5% fiber; and the remainder mineral aggregate.

In yet another aspect, the invention is a portable conversion device for converting a conventional asphalt plant into a modified asphalt plant.

Other advantages and a fuller appreciation of specific adaptations, compositional variations, and physical attributes will be gained upon an examination of the following detailed description of preferred embodiments, taken in conjunction with the figures of the drawing. It is expressly understood that the drawings are for the purpose of illustration and description only, and are not intended as a definition of the limits of the invention.

BRIEF DESCRIPTION OF THE DRAWINGS

The preferred exemplary embodiment of the present invention will hereinafter be described in conjunction with the appended drawing wherein like designations refer to like elements throughout and in which.

DETAILED DESCRIPTION

Figure 1:
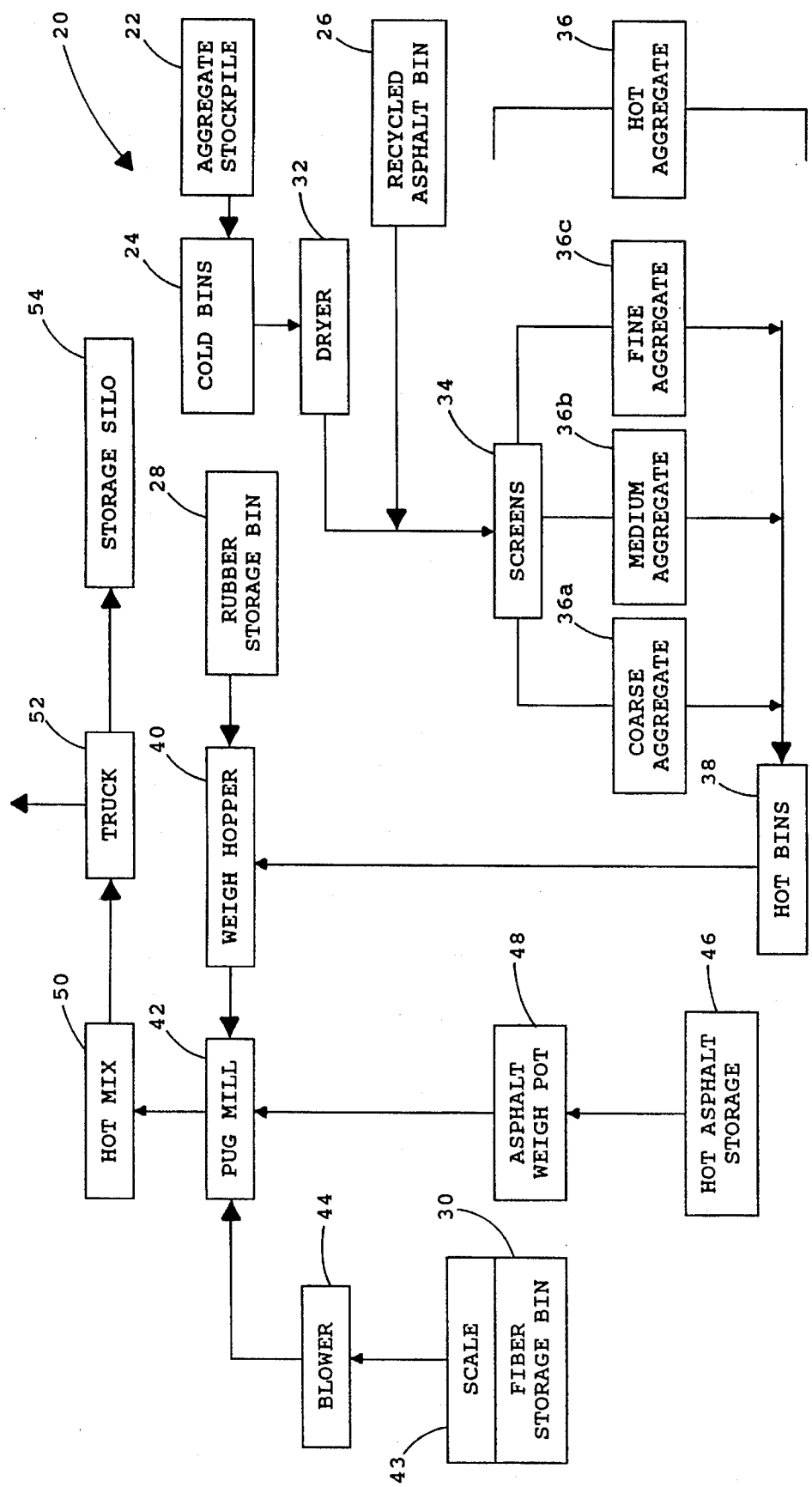
FIG. 1 is a flow chart depicting the system of making the composition in accordance with the present invention.

The present invention relates broadly to asphalt concrete compositions. Specifically, the invention relates to an asphalt concrete composition that includes rubber aggregate and fiber strands. The invention also relates to a method of making the composition and a method of using the composition for road paving applications.

The present invention is particularly well-suited for use in repaving and repairing of road surfaces that are cracked and weathered. The present invention will now be described in detail with respect to such fields of endeavor; however, those skilled in the art will appreciate that such a description of the invention is meant to be exemplary only and should not be viewed as limitative on the full scope thereof.

The present invention provides a fiber-reinforced rubber asphalt concrete. The present invention is more resistant to cracking than conventional asphalt concretes and is characterized by an ability to be laid down on top of cracked asphalt surfaces without immediate recracking. The composition is durable, stable and flexible. The composition of the present invention is manufactured and applied at a cost comparable to conventional asphalt concretes. These attributes are achieved through a novel composition meeting a special combination of physical and chemical features.

As used herein, the term "aggregate" refers to any hard, inert stone and sand. The terms "particulate rubber," "granular rubber," "rubber granulates" "rubber particulates" and "rubber aggregate" are meant to refer to granules or particulates of rubber used as aggregate in an asphalt concrete composition. The term "asphalt concrete" refers generally to a composition that includes aggregate, asphalt cement and other additives. The term "asphalt cement" as used herein and in the art refers to any commercially available asphalt cement and is meant to include bituminous substances generally defined as natural- or petroleum-refiner asphalts. Such material is conveniently characterized by a penetration value of from 0–300 or higher (ASTM D5), and preferably 40–300, with a softening point in the range of about 90°–250° F., and preferably between 100°–150° F. The term "recycled asphalt" refers to asphalt concrete that has been previously used, e.g., laid down as pavement. The terms "conventional asphalt" and "standard asphalt" are meant to refer to asphalt concrete whose specifications are typically set forth by state governmental agencies or trade associations. The term "modified asphalt" is meant to refer to asphalt concrete that contains additives or ingredients, i.e., rubber and fiber, in addition to those of conventional asphalt concrete.

The composition in accordance with the present invention is based upon an admixture of rubber aggregate and fiber strands into a conventional asphalt concrete composition to form a modified asphalt concrete. The rubber imparts flexibility to the composition while the fiber imparts stability to the composition. The rubber aggregate is preferably rubber granules or particulates that are obtained from grinding used vehicle tires from which metal and fiber have been removed.

In the composition in accordance with the present invention, the rubber aggregate is present in the range by weight of about 1% to about 10%, preferably in the range of about 1% to 5%; the fiber is present in the range of about 1 lb to about 10 lb per ton of composition, preferably about 1 lb to about 8 lb per ton, i.e., 0.05%–0.5%, preferably 0.05%–0.4%; the asphalt cement is present in the range of about 1% to about 8% by weight, preferably about 4% to about 6%; and the remainder is mineral aggregate. The mineral aggregate in appropriate applications, such as track or road applications, also suitably includes recycled asphalt concrete that has been crushed as well as aggregate conventionally used in the asphalt art as defined hereinafter.

The actual amounts of each component of the composition are chosen depending on the desired end formulation; generally, the higher fiber content, the higher the stability (strength), and the higher the rubber content, the more flexibility, except that high rubber content and high fiber content together create higher air voids in the composition which in turn produce more flexibility. A composition in accordance with the present invention for a typical road application (a high volume and heavy traffic count) suitably includes approximately 1–3% by weight rubber and 4–8 lbs fiber per ton of composition. Such range provides high stability from the fiber and low to medium flexibility from rubber.

For a parking lot application, a typical composition includes 1–3% rubber and 3–5 lbs fiber per ton. Here the traffic count is low, and the composition provides medium flexibility and medium stability. In a pedestrian path application where traffic is light, a suitable composition has about 4–10% rubber and 1–4 lbs fiber per ton of composition, providing high flexibility.

For a running track application, a suitable composition is highly flexible and contains a high number of air voids for cushioning. Such a composition suitably includes about 5–10% rubber and 3–6 lbs fiber per ton of composition.

The rubber aggregate is suitably crumb vulcanized rubber that is formed from grinding worn and discarded vehicle tires from which the belting material, e.g., the steel and fiber cord, has been removed. Any of the various vulcanized rubber compositions that go to make up a modern day vehicle tire including the white wall portion are suitable for use in accordance with the present invention. Such rubber aggregate is available from, e.g., crumb rubber producers such as Baker Rubber, Inc. of South Bend, Ind., and Rebound Rubber Recycling of Columbus, Wis. In accordance with the present invention, the rubber aggregate size is preferably between about 15–45 mesh, most preferably 20 mesh.

The fibrous materials employed in the composition of the present invention are preferably synthetic organic fibers. The organic fibers are generally employed in a length of about ¼ inch to ½ inch and diameter of about 0.00085 inch. Preferred are polyester fibers. Examples of suitable polyester fibers for the present invention are poly(ethylene terephthalate), poly(1,4-cyclohexanemethylene terephthalate), poly(vinyl acetate), poly(methyl acrylate), poly(methyl methacrylate) and poly(hexamethylene fumarate). A highly preferred polyester fiber is poly(ethylene terephthalate) which has been treated with an anti-static agent, such as Petroflex™ commercially available from GFC Corporation, Appalachian, N.Y.

The asphalt cement which can be employed in the composition of the present invention includes any of the conventional bituminous asphalts. The asphalt cements are characterized by having penetration grades of up to 300 as measured by ASTM D5. Preferred are asphalts of approximately 25 to 300 penetration grade.

The mineral aggregate that is suitably employed in accordance with the present invention is substantially the same as that used in conventional asphalt concrete, e.g., crushed rock, stone, gravel, sand, that is sized from coarse aggregate (that retained by a 2.36 mm (No. 8) sieve) to fine aggregate (that which passes a No. 8 sieve) to mineral dust or filler (that which passes a No. 200 sieve). Any size distribution of the aggregate particles which gives a composition of the present invention with desired characteristics is within the scope of this invention. In order to obtain a particularly useful density, flexural strength and crack resistance, a highly preferred mineral aggregate includes ⅛ inch, ¼ inch and ⅜ inch diameter aggregate in a size distribution such as that given in Table 1.

TABLE 1

| Sieve No. | Aggregate Blends and Job Formula | | | | | |
| --- | --- | --- | --- | --- | --- | --- |
| | Product No. 1 (% passing) | Product No. 2 (% passing) | Product No. 3 (% passing) | Blend (% passing) | Design Formula (% passing) | Master Limits |
| 1 ½" | 100 | 100 | 100 | 100 | 100 | — |
| 1" | 100 | 100 | 100 | 100 | 100 | — |
| ¾" | 100 | 100 | 100 | 100 | 100 | 100 |
| ½" | 96.6 | 100 | 100 | 97.4 | 97 | 90–97 |
| ⅜" | 85.8 | 100 | 100 | 89.4 | 89 | 75–95 |
| No. 4 | 64.5 | 22.2 | 98.3 | 65.3 | 65 | 45–75 |
| No. 8 | 52.0 | 1.8 | 70.7 | 49.8 | 50 | 30–55 |
| No. 16 | 43.5 | 1.1 | 53.2 | 40.7 | 41 | — |
| No. 30 | 34.5 | 0.9 | 40.3 | 32.0 | 32 | 15–35 |
| No. 50 | 17.7 | 0.8 | 15.8 | 15.7 | 16 | 10–25 |
| No. 100 | 8.2 | 0.6 | 2.4 | 6.6 | 7 | — |
| No. 200 | 5.4 | 0.4 | 0.7 | 4.2 | 4.2 | 3–8 |
| BLEND | 75 | 10 | 15 | 100 | | |

Also suitable as a mineral aggregate component is crushed, recycled asphalt concrete. Such recycled asphalt concrete suitably may make up from about 10% and can be as high as 100% of the mineral aggregate component.

The quality of the mineral aggregate utilized in accordance with the present invention is substantially the same as that used in conventional asphalt. During processing, however, the amount of aggregate is reduced to account for the rubber aggregate, i.e., the rubber particulates replace some of the mineral aggregate, typically replacing the finer aggregate such as aggregate passing No. 4 size and down.

It has been found that the composition in accordance with the present invention possesses excellent flexural strength and crack resistance. Surprisingly, it has been found that the compositions of the present invention can be laid down as a surface or wear layer over cracked and disintegrated conventional asphalt concrete with substantially less reflective cracking than conventional asphalt compositions.

The present invention also encompasses a method of making the compositions hereinbefore described. Generally, the method includes charging a mixing chamber or pugmill with the predetermined quantities of mineral aggregate and rubber aggregate; admixing the charge; mixing in the fibrous material; and admixing the entire combination as a dry cycle. Thereafter, the asphalt cement is charged and the admixture mixed as a wet cycle to produce a composition in accordance with the present invention.

Reference is now made to FIG. 1 wherein a flow chart schematically illustrates the system in accordance with the present invention. The system generally designated as 20 includes a mineral aggregate stockpile 22 including a cold storage bin 24, a recycled asphalt storage bin 26, a rubber aggregate storage bin 28 and a fiber storage bin 30. The mineral aggregate from bin 24 is heated in a dryer 32 to a temperature of about 325° to about 500° F., preferably about 325° to about 360° F. The heated mineral aggregate is then sized at screens 34 into a hot aggregate dry mix 36, for example, into a coarse aggregate 36a, a medium aggregate 36b and a fine aggregate 36c, and placed in a hot aggregate storage 38. The heated mineral aggregate is then weighed in a weigh hopper 40. The rubber aggregate is then conveyed from the storage bin 28 to weigh hopper 40 and is weighed by difference. The hot mineral aggregate 36 and rubber aggregate are then discharged to the mixing chamber or pugmill 42. The hot mineral aggregate 36 and rubber aggregate are mixed for about 15 sec. as a dry cycle while the fibrous material is blown by a blower 44 to the pugmill 42. The fiber is weighed by difference using a scale, e.g., platform cell 43 at the storage bin 30. Hot asphalt cement is stored in a storage bin 46 and is conveyed and weighed at a hot asphalt measuring pot 48. The hot asphalt cement is then added to the pugmill 42. The admixture mixed for about 35 sec. as a wet cycle to produce a hot asphalt concrete composition in accordance with the present invention. The total mix cycle is about 50–60 sec. The hot mix 50 is discharged to a truck 52 or optionally to a storage silo 54.

If a used recycled asphalt 26 is to be a component of the mineral aggregate, it is added cold to the heated mineral aggregate at the hot elevator (as described hereinafter or at the weigh hopper 40) and then proceeds with that aggregate through the remaining steps. The cold recycled asphalt is heated by heat transfer. Thus, the temperature to which the virgin aggregate is heated is higher so that the combination virgin aggregate and recycled asphalt is about 360° F. when the rubber aggregate is added.

Figure 2:
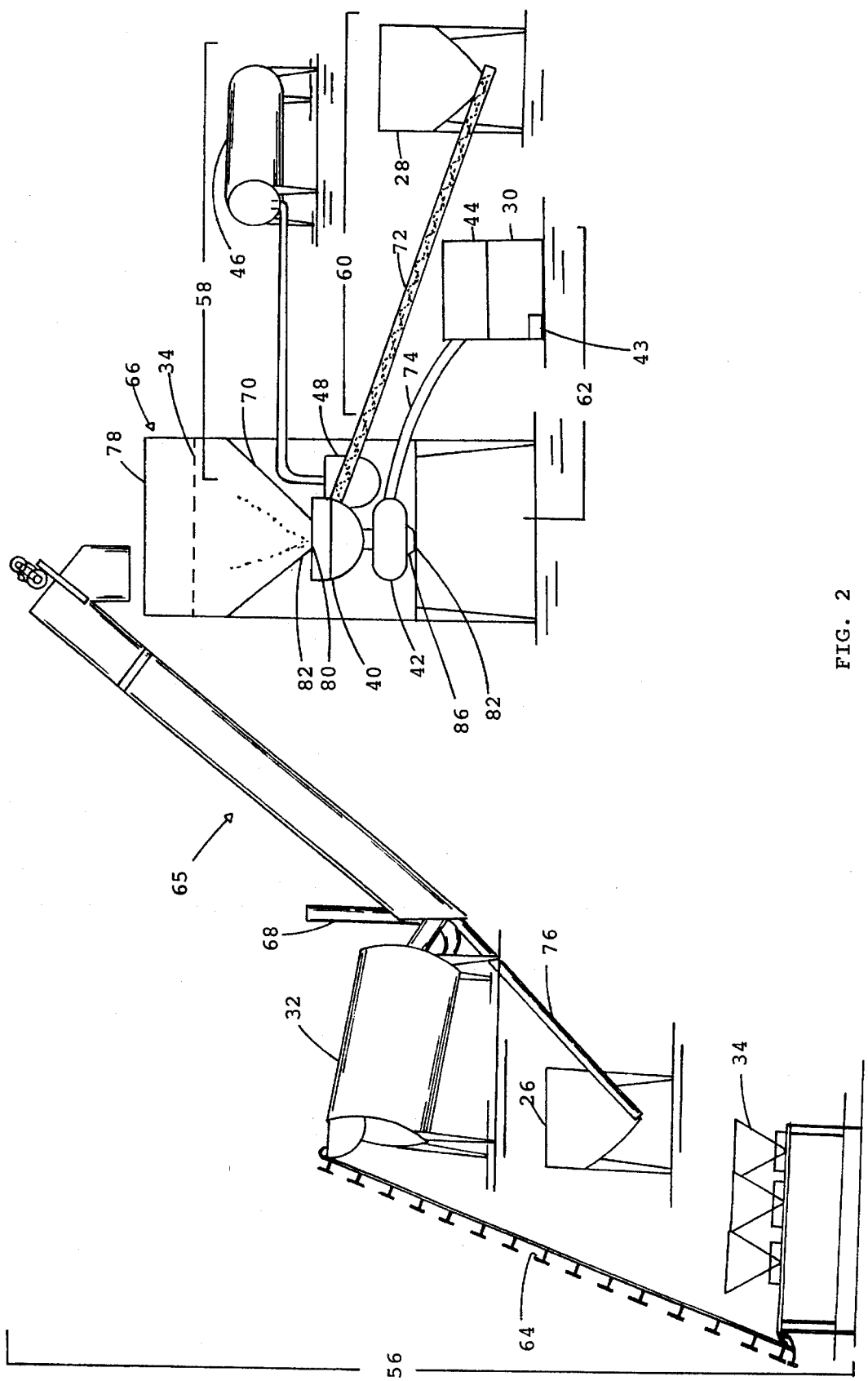
FIG. 2 is a schematic representation of a batch asphalt plant for making the composition of the present invention.
Figures 3, 4, 5:
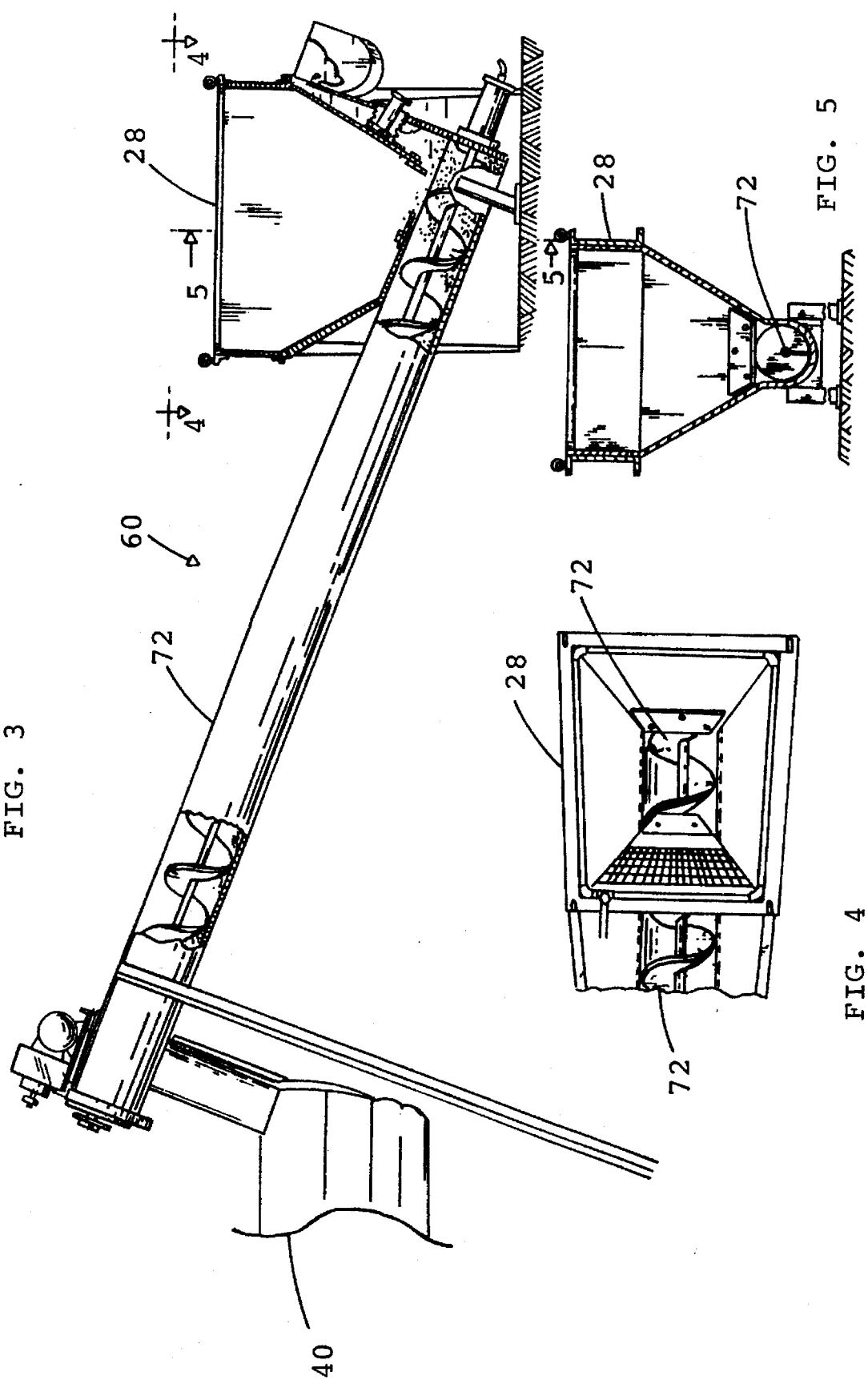
FIG. 3 is a partial sectional view of the rubber delivery system in accordance with the present invention.
FIG. 4 is a top view of the system of FIG. 3.
FIG. 5 is a cross section taken along line 5—5' of FIG. 4.

Reference is now made to FIG. 2 depicting schematically an asphalt plant for implementing the system of FIG. 1. The plant includes an aggregate supply system 56, an asphalt cement supply system 58, a rubber supply system 60 and a fiber supply system 62. The aggregate supply system 56 includes the cold storage bins 24, a cold elevator 64, the aggregate dryer 32, a hot elevator 65, a mixing tower 66 and an emission control system 68. The tower 66 includes a screen deck 34, and hot aggregate bins 70. Also, included in the tower 66 is the weigh hopper 40, an asphalt cement weigh bucket 48, and the pugmill 42. The rubber supply system 60, as best seen in FIGS. 3–5, includes the rubber aggregate storage 28, and an auger 72 for delivery of the rubber aggregate to the weigh hopper 40. The fiber delivery system 62 includes the fiber storage bin 30, a scale such as a platform scale 43, and a fiber blower 44 and a duct 74 for connecting to the pugmill 42. Also included is a recycled asphalt storage 26 having a recycled asphalt delivery system 76. All operations are conveniently computer controlled (not shown).

As described hereinbefore, the mineral aggregate used in the composition of the present invention is removed from stockpiles 22 and placed in individual cold-feed bins 24. The cold conveyor 64 transports the mineral aggregate to the dryer 32. As the aggregate is tumbled, heated and dried in dryer 32, exhaust gases are collected and vented through an exhaust stack 68. Dust particles that are carried by the exhaust gases are also collected. The hot aggregate is then transported to the top 78 of the plant mixing tower 66 by the hot elevator 65 and passed through the screen deck 34. The hot aggregate is then held in the hot bins 70 until it is discharged from a gate 80 at the bottom 82 of each bin into the weigh hopper 40. The correct proportion of each aggregate size is dropped into the weigh hopper 40. The rubber auger 72 then discharges rubber aggregate from the rubber aggregate storage 28 into weigh hopper 40. The correct proportion of rubber aggregate is also determined by weight, and the heated aggregate and rubber aggregate are then emptied into pugmill 42. The heated aggregate and rubber aggregate are mixed together, while the fiber from fiber storage 30 is blown by blower 44 through duct 74 into the pugmill 42 and weighed by difference by platform scale 43. After about a 10-sec. dry mix period, the asphalt cement from the asphalt weigh bucket 48 is discharged into the pugmill and the entire admixture is mixed about a 35-sec. wet mix period. When mixing is complete, the gates 84 on the bottom 86 of pugmill 42 are opened and the mix is discharged in a haul vehicle 52 or into a conveyor device (not shown) that carries the mix to a storage silo and eventually into the vehicle 52.

Figure 6:
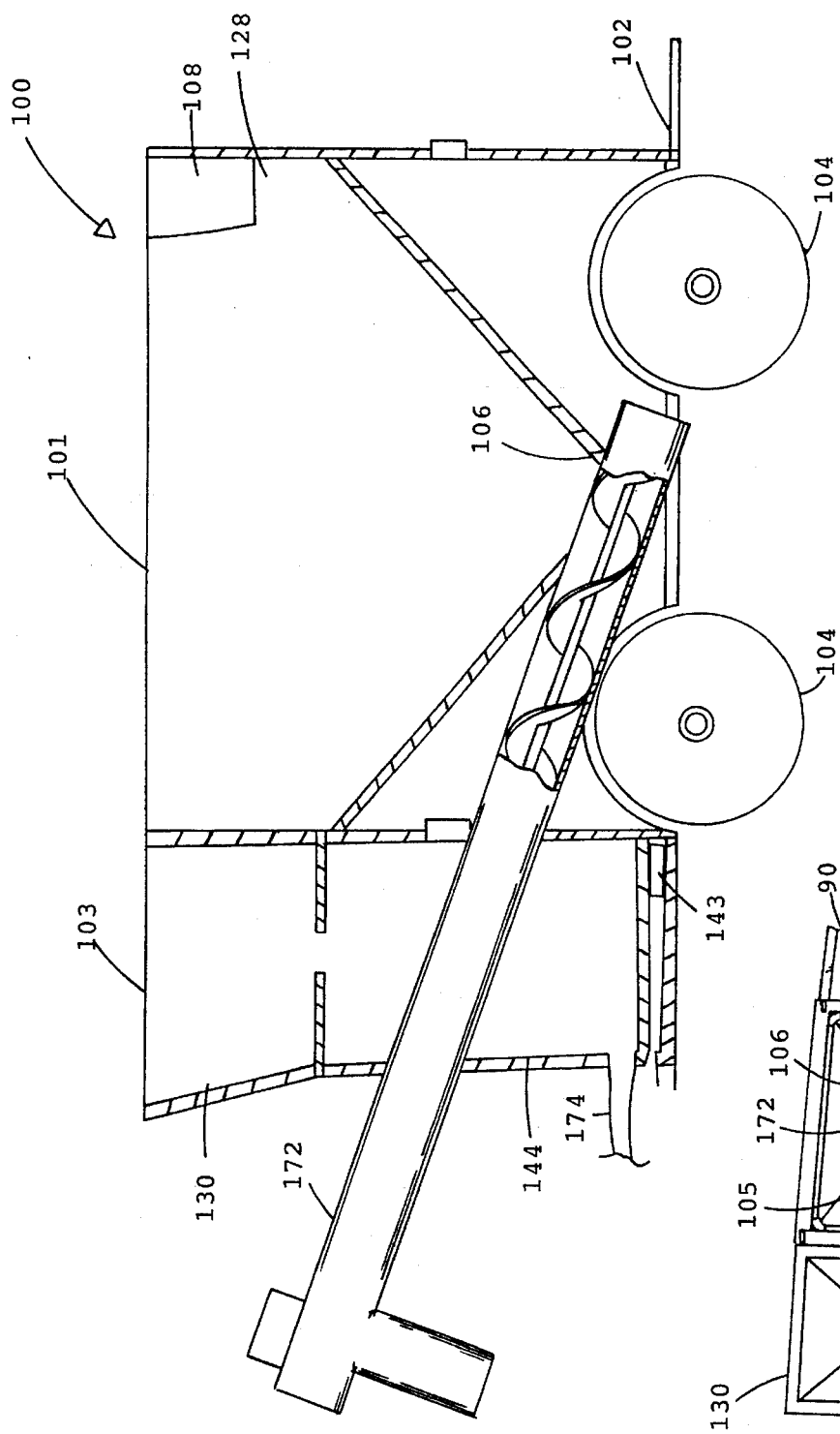
FIG. 6 is a portable conversion device for converting a conventional asphalt plant to a plant capable of making the composition of the present invention.
Figure 7:
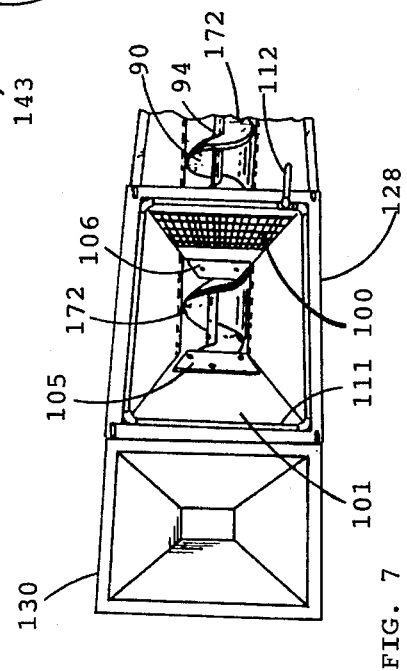
FIG. 7 is a partial top view of the portable conversion device shown in FIG. 6.

In another aspect, the present invention is a method of modifying a conventional asphalt plant into a plant capable of making the composition in accordance with the present invention. Reference is now made to FIG. 6, in which a portable cart generally designated as 100 is shown schematically in partial cross section. The basic design of cart 100 is a typical farm wagon chassis 102 with tires 104 of capacity of 8,000 to 10,000 lbs. The cart 100 includes the rubber unit 101 and a fiber unit 103 includes a rubber aggregate bin 128 and an auger 172 for conveying the rubber aggregate. Bin 128 is suitably a gravity-feed bin such as a grain bin with a bottom discharge chute 106 and cleanout. Auger 172 is suitably a 10", 5 Hp grain auger. The length of auger 172 is determined by placement of cart at plant and the length from bottom discharge 106 to input opening in weigh hopper 40. An electric motor (not shown) for auger 172 is tied to weight controls (not shown) and turns on and off when desired weight of rubber is reached. An electric control panel 108 is mounted to side of rubber bin 128. The fiber unit 103 of cart 100 includes a modified insulation blower 144 mounted on platform scale 143 with a bulk feed hopper 130 at top. Blower 144 runs constant agitators (not shown) and air lock (not shown) turns on and off automatically when the desired amount of fiber is blown into the mix in batch plant. Fiber can be added at weigh hopper or pugmill in batch plant. The cart is pulled onto a site and placed in position under or near the weigh hopper/pugmill area. Power is run to the control panel 108, and on/off controls are run to control room and operated manually or tied to a computer which weighs and measures amount of rubber and fiber desired depending upon the particular design and application.

Further, the invention also provides a method of for improving the resistance of the surface of a pavement to corrosion, deterioration, disintegration and cracking. The method includes applying directly to the pavement or pavement sublayer at least one layer of the composition in accordance with the present invention. The composition preferably has a construction site temperature of about 300° F. to about 350° F. and a lay down temperature of about 280° F. to about 325° F. The layer is preferably in thickness about 1½ inches to about 2 inches. Compaction should begin immediately upon lay down and continue until there is no longer any visible flexion in the layer. The asphalt composition in accordance with the present invention can be stored in hot bins for up to 24 hours before delivery to the as long as temperature is maintained construction site. As the material is being delivered, it is preferred that the delivery vehicle be covered to prevent surface cooling of the composition.

In a further embodiment, the invention is a upper wear surface of a road pavement which is a composition in accordance with the present invention. Once the composition of the present invention is applied to the surface, compaction should begin as soon as possible. The compaction should continue until the pavement has cooled and elastic movement of the composition can no longer be observed. The temperature of the composition at this point is typically about 150°–175° F.

The present invention is further explained by the following examples which should not be construed by way of limiting the scope of the present invention. In the following description of the method of the invention, process steps are carried out at room temperature and atmospheric pressure unless otherwise specified.

EXAMPLE 1

Mineral aggregate was heated in a dryer conventional in the art to a temperature of about 350° F. and transferred to a screen deck that separates the aggregate into 3–4 sizes. The heated aggregate was transferred to hot bins wherein the bottom gates were opened and 1875 lbs. of hot aggregate and 25 lbs. of rubber aggregate were weighed in a weigh hopper and then emptied into the pugmill. The heated mineral and rubber aggregates were mixed for 10 sec., while 5 lbs. of anti-static polyester fiber were blown into the weigh hopper and emptied into the pugmill to be mixed and complete the dry mix. Then 100 lbs. asphalt cement, AC-20, were weighed in an asphalt weigh bucket and emptied into the pugmill. The resulting admixture was mixed for a 35-sec. wet cycle. The resultant hot mix composition was discharged into a haul vehicle.

EXAMPLE 2

A composition in accordance with the present invention was made as described in Example 1, except that 200 lbs. of recycled asphalt was substituted for that portion of the mineral aggregate and the initial temperature of the mineral aggregate was higher than in Example, i.e., 425° F.–450° F.

EXAMPLE 3

A composition was made in accordance with the procedure of Example 1 except that 3,670 lbs. of aggregate was used, 80 lbs. of rubber aggregate, 10 lbs. of polyester, and 240 lbs. of AC-20. This 2-ton batch, thus, contains, by weight, 6% AC, 2% rubber, 0.25% fiber. This mix is suitable for medium traffic.

EXAMPLE 4

A composition was made in accordance with the procedure of Example 1 except that 4,659 lbs. of aggregate was used, 50 lbs. of rubber aggregate, 16 lbs. of polyester, and 275 lbs. of AC-20. This 2½-ton batch contains 5.5% AC, 1% rubber, 0.32% fiber. This mix is suitable for heavy traffic.

FIELD TESTS

EXAMPLE 5

An eight- to ten-year-old, approximately 18,000-sq. ft. parking lot that was apparently constructed of conventional asphalt was overlaid with a composition in accordance with the present invention. Inspection of the parking lot prior to overlay with the composition of the present invention for physical condition showed that about 45% of the lot was cracked. Of this about 25% was age cracking, 10% cracking from base failure, and about 10% patching cracking from previous failures. Ten tons of the asphalt composition in accordance with the present invention was used to fill and level the lot. The lot was then overlaid with a 1.5-in. fiber-reinforced rubberized asphalt composition in accordance with the present invention which contained 2% rubber, 2 lbs. of fiber per ton, i.e., 0.1% fiber, and 5.7% AC. Interval inspection of the lot showed no cracking for 18 months after the completion of the overlay. Standard asphalt composition under such conditions would show cracking within 10 weeks.

EXAMPLE 6

Two new 12,000-sq. ft. parking lots were constructed using the composition in accordance with the present invention as the paving agent. The area to be a lot was graded and six inches of limestone base was installed, graded and compacted. The area was then paved with hot fiber-reinforced rubberized asphalt in accordance with the present invention which contained 1% rubber, 2 or 4 lbs of fiber per ton and 5.5% AC. One lot was paved with rubber aggregate sized at about 10 mesh, while the other lot was paved with rubber sized at about 2 mesh (i.e., long thin strands of rubber) and 4 lbs per ton of fiber. Interval inspection was conducted and both lots showed no signs of cracking after 18 months.

EXAMPLE 7

A 400 meter by 21 ft. wide running track was constructed over an existing cinder track. The existing track was regraded, widened and expanded to a 440-yd track. A sub-base of recycled asphalt and a leveling course of hot mix asphalt was installed. Then the area was overlaid with hot fiber-reinforced rubberized asphalt in accordance with the present invention. This composition contained about 10% rubber sized at about 12 mesh, 9% AC and 2 lbs of fiber per ton; i.e., 0.1% fiber. Interval inspection for cracking and wear was conducted. Only after one year did any rutting or raveling appear in the high traffic areas.

EXAMPLE 8

A small airfield runway was paved with the composition in accordance with the present invention. The existing runway appeared to have been paved with a binder-sized stone asphalt which appeared to be about 10 to 15 years old. The runway appeared to have been built on an unstable sub-base and more than 50% of the runway was cracked with extensive signs of sub-base failure. The runway was overlaid with five different compositions in 12-ft. lanes, each of the differing compositions are as follows: Lane 1: 1% rubber, 5 lbs fiber per ton, i.e., 0.2%; Lane 2: 2% rubber, 4 lbs fiber per ton, i.e., 0.2%; Lane 3: 1% rubber; Lane 4: conventional asphalt mix—Wisconsin Department of Transportation motor vehicle asphalt mix; Lane 5: 6 lbs of fiber per ton, i.e., 0.3%. Inspection of the physical conditions of all lanes has been conducted. Lane 4, the standard mix, began cracking before the entire field had been overlaid. After 6 months, including a winter of usually heavy snowfall, recracking appeared as follows: Lane 1—10%; Lane 2—15%; Lane 3—30%; and Lane 5—20%.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

I claim:

1. An asphalt concrete composition, comprising in percent by weight, 1%–10% robber aggregate; 0.05%–0.5% fibrous material, wherein said fibrous material is anti-static treated polyester fiber; 1%–8% asphalt cement; and the remainder mineral aggregate.

2. The composition of claim 1, wherein the composition has 1%–5% rubber aggregate, 0.05%–0.4% fibrous material; and 4%–6% asphalt cement.

3. The composition of claim 1, wherein said rubber aggregate is 15–45 mesh.

4. The composition of claim 1, wherein said rubber aggregate is recycled crumb rubber or buffings from tire recaps.

5. The composition of claim 1, wherein said polyester fibers are about ¼ inch to about ½ inch in length and about 0.00085 inch in diameter.

6. The composition of claim 1, wherein said mineral aggregate further comprises recycled asphalt, wherein said recycled asphalt is substituted for a portion of said mineral aggregate.

7. A method of making an asphalt concrete composition, comprising the step of combining in admixture by percent by weight, 1%–10% rubber aggregate; 0.05%–0.5% fibrous material, wherein said fibrous material is anti-static treated polyester fiber; 1%–8% asphalt cement; and the reminder mineral aggregate, wherein said combining step includes:

(a) heating said mineral aggregate to a temperature of about 325°–500° F.;

(b) admixing said mineral aggregate with said rubber aggregate to form a mineral/rubber aggregate admixture;

(c) admixing for a first time period said fibrous material with said aggregate admixture to form a dry mix; and (d) admixing for a second time period said asphalt cement with said dry mix to form a hot, wet mix.

8. The method of claim 7, wherein said first time period is about 15 sec.

9. The method of claim 7, wherein said second time period is 35 sec.

10. The method of claim 7, wherein said temperature is 325°–360° F.

11. The method of claim 7, wherein step (b) includes sizing said rubber aggregate prior to admixing with said mineral aggregate into 15–45 mesh particulates.

12. The method of claim 7, wherein said polyester is blown into said mineral aggregate and said rubber aggregate.

13. The method of claim 7, wherein step (a) includes heating said mineral aggregate to a temperature of about 450°–500° F. and admixing recycled asphalt with said heated mineral aggregate.

14. A method of recycling crumb rubber, comprising admixing 1%–10% by weight used crumb rubber into an admixture 0.05%–0.5% fiber, wherein said fiber is anti-static treated polyester fiber; 1%–8% asphalt concrete; and the remainder mineral aggregate to form a fiber-reinforced rubberized asphalt concrete composition.

15. An asphalt composition having crack-resistant property and capable of being paved over a cracked conventional asphalt pavement without immediate recracking, the composition comprising in percent by weight, 1%–10% rubber aggregate; 0.05%–0.5% fibrous material, 1%–8% asphalt cement; and the remainder mineral aggregate; said fibrous material being anti-static treated polyester fiber, and being about ¼ inch to about ½ inch in length and about 0.00085 inch in diameter; said rubber aggregate being recycled rubber; said mineral aggregate selected from the group consisting of crashed rock, stone, gravel, sand, recycled asphalt and a combination thereof.

16. The asphalt composition of claim 15, wherein said rubber aggregate has a mesh size of about 15–45.

17. The method of claim 7, wherein said step (c) comprises blowing said fibrous material into said aggregate admixture.

* * * * *